United States Patent [19]

Mitchell et al.

[11] Patent Number: 4,829,145
[45] Date of Patent: May 9, 1989

[54] CORRUGATED PLASTIC CONDUIT SYSTEM

[75] Inventors: Robert A. Mitchell, Fort Mill, S.C.; Thomas E. Lavely, Matthews, N.C.

[73] Assignee: Queen City Plastics, Inc., Charlotte, N.C.

[21] Appl. No.: 103,301

[22] Filed: Oct. 1, 1987

[51] Int. Cl.$^4$ .............................................. H02G 3/06
[52] U.S. Cl. ................................. 174/65 G; 285/158; 285/903
[58] Field of Search ........................... 174/65 R, 65 G; 285/158, 159, 161, 903

[56] References Cited

U.S. PATENT DOCUMENTS

| | | | |
|---|---|---|---|
| 1,659,094 | 2/1928 | Godfrey | 285/158 X |
| 2,236,130 | 3/1941 | Betebenner | 285/161 |
| 3,711,632 | 1/1973 | Ghirardi | 285/903 X |
| 3,711,633 | 1/1973 | Ghirardi et al. | 285/903 X |
| 4,248,459 | 2/1981 | Pate et al. | 174/65 G X |
| 4,443,031 | 4/1984 | Borsh et al. | 285/903 X |
| 4,494,779 | 1/1985 | Neff et al. | 285/159 |

Primary Examiner—A. T. Grimley
Assistant Examiner—David A. Tone
Attorney, Agent, or Firm—Bell, Seltzer, Park & Gibson

[57] ABSTRACT

The conduit system includes a connector fitting joining adjacent ends of a pair of the corrugated plastic conduits in end-to-end relationship, a junction box inlet connector joining one end portion of the corrugated plastic conduit in an opening in one wall of a junction box, and a switch box inlet fitting joining one end portion of the corrugated plastic conduit in an inlet opening in one wall of a switch box. Both the connector fitting and the switch box inlet fitting include a pair of hingedly connected semicircular clamping elements each including integrally molded rib members and including locking means on the opposite side from the hinge member with both the locking means and the hinge member being embedded in opposite sides of the clamping elements so that they do not extend outwardly from opposite sides thereof. Both ends of the connector fitting are identical while one end of the switch box inlet fitting has concentric interior and exterior surfaces for adhesively securing the same in the switch box. The junction box inlet connector includes a pair of semicircular flat snap ring elements adapted to be inserted around the depressions in the plastic conduit at opposite sides of an opening in the wall of the junction box to maintain the end portion of the plastic conduit in position in the junction box.

9 Claims, 2 Drawing Sheets

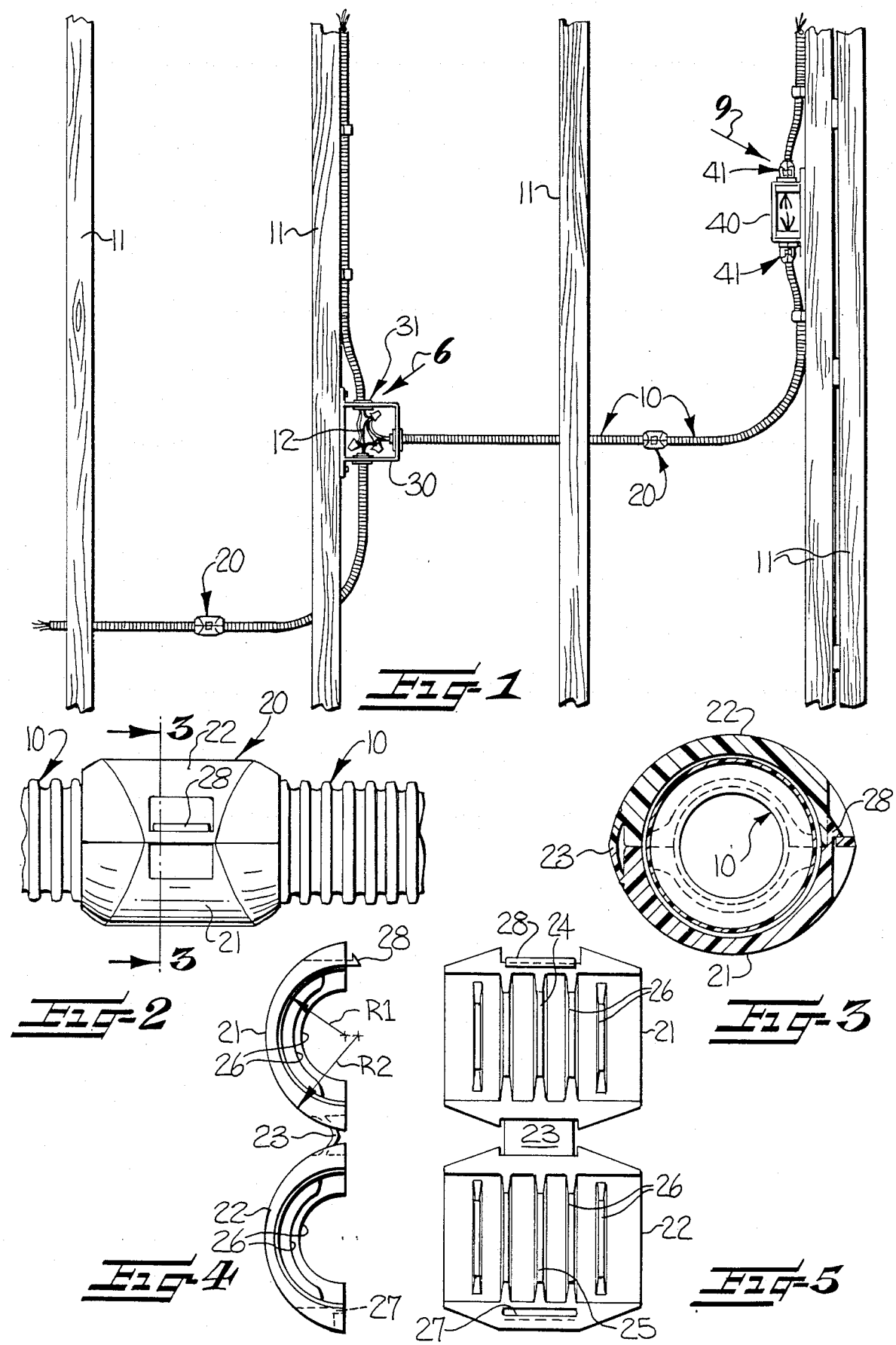

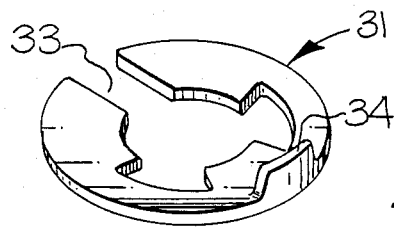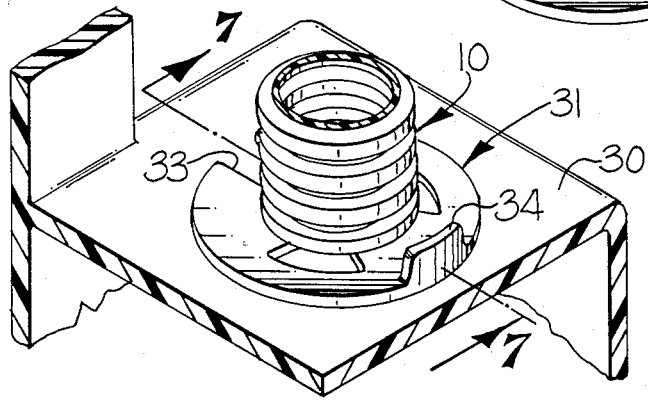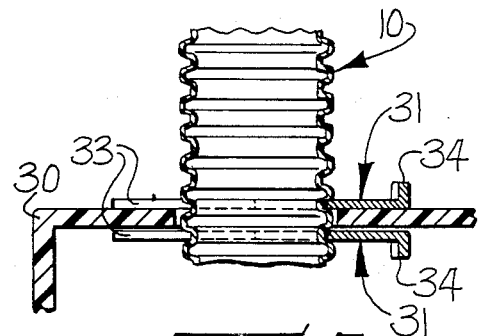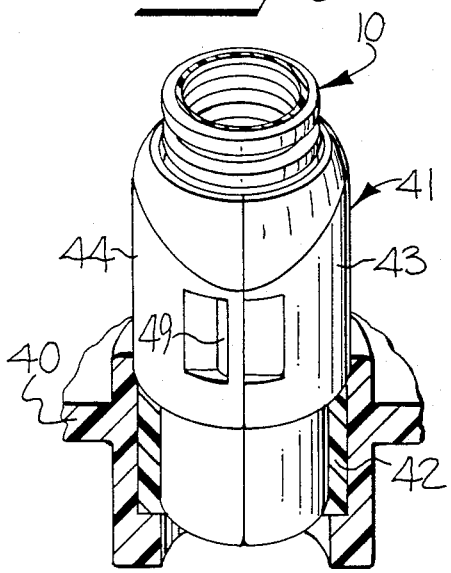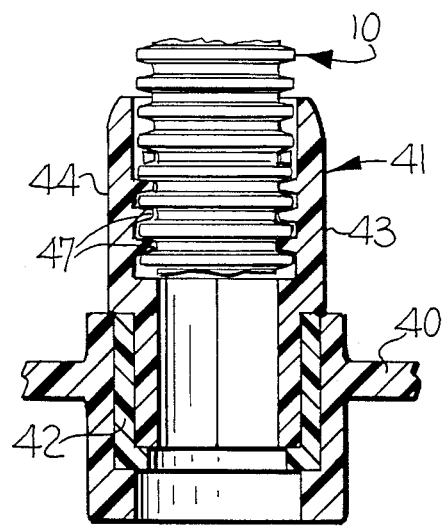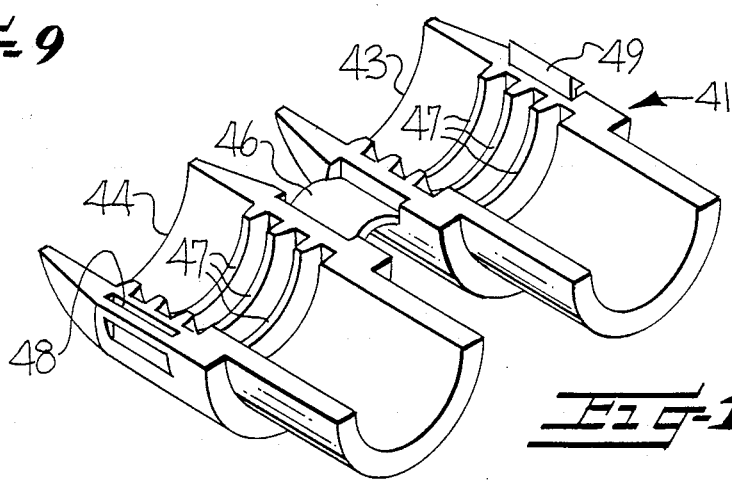

CORRUGATED PLASTIC CONDUIT SYSTEM

FIELD OF THE INVENTION

This invention relates generally to a corrugated plastic conduit system for supporting and enclosing electrical conductors, and more particularly to such a system which includes a connector fitting for joining adjacent ends of a pair of corrugated plastic conduits in end-to-end relationship, a junction box inlet connector for joining one end of a conduit to an opening in one wall of a junction box, and a switch box inlet fitting for joining one end of a conduit in an elongated inlet opening in one wall of a switch box.

BACKGROUND OF THE INVENTION

It is generally known to provide a system for supporting and enclosing electrical conductors in corrugated plastic conduits extending through building structural elements. For example, U.S. Pat. No. 4,248,459 discloses a flexible conduit system which includes several different types of connector fittings for joining adjacent ends of a pair of corrugated plastic conduits in end-to-end relationship, and two types of junction box inlet connectors for joining one end portion of the corrugated plastic conduit in an opening in one wall of a junction box. A connector fitting for joining adjacent ends of a pair of corrugated plastic conduits in end-to-end relationship is disclosed in U.S. Pat. No. 4,443,031. A junction box inlet connector is disclosed in U.S. Pat. No. 4,494,779.

These patents, and the patents referred to therein, are representative of the various types of corrugated plastic conduit systems which have been provided. While the connectors disclosed in these patents will operate to maintain the ends of the corrugated plastic conduits in end-to-end position, these connectors are somewhat bulky and have a tendency to catch and hang when the corrugated plastic conduit is passed through openings formed in studs and the like. Also, the fasteners for maintaining the connectors in closed position extend outwardly from the connectors and form "ears" which may be caught on various portions of the building structure so that the connectors may be disconnected from clamping engagement with the plastic conduit.

SUMMARY OF THE INVENTION

With the foregoing in mind, it is an object of the present invention to provide a corrugated plastic conduit system for supporting and enclosing electrical conductors which includes a connector fitting for joining adjacent ends of a pair of plastic conduits in end-to-end relationship, a junction box inlet connector for joining one end portion of the corrugated plastic conduit in an opening in one wall of a junction box, and a switch box inlet fitting for joining one end portion of the corrugated plastic conduit in an elongated inlet opening in one wall of a switch box, and wherein the connectors and fittings are easily positioned on the plastic conduit and are maintained thereon during use.

The connector fitting of the present system includes a pair of semicircular clamping elements, each having opposite sides adapted to mate together and providing a circular passageway therebetween. An inner concave surface is defined by a radius positioned on a line extending between the opposite sides of each of the clamping elements and a convex outer surface is defined by a radius positioned outwardly of a line extending between opposite sides of each of the clamping elements so that the thickness of opposite side portions of each of the clamping elements is greater than the thickness of the medial portions of each of the clamping elements to provide an oval-shaped outer peripheral surface on the connector fitting. An integrally molded hinge member connects adjacent opposite sides of each of the clamping elements and permits the clamping elements to be closed around opposite end portions of adjacent corrugated plastic conduits. Integrally molded rib members extend inwardly from the inner concave surface of each of the clamping members and the rib members are adapted to fit within depressions of the corrugated plastic conduits positioned therein. A locking slot is positioned in one of the opposite sides of the clamping members opposite the hinge member and a locking tongue extends upwardly from the opposite side of the other of the clamping members and is adapted to extend into and engage with the locking slot when the clamping members are positioned in clamping and mating relationship with each other. The hinge member, as well as the locking slot and tongue, are embedded in the opposite thicker side edges of the clamping members so that they do not extend outwardly therefrom. Opposite end portions of the clamping members are tapered inwardly to form a smooth transition between the outer diameter of the corrugated plastic conduits and the connector fitting so that the flexible conduit may be pulled through wall studs without binding or snagging.

The junction box inlet connector includes a pair of snap ring elements having a thickness substantially equal to the width of the depressions of the corrugated plastic conduits. Each of the snap ring elements includes an opening of lesser width than the diameter of the depressions of the plastic conduit for permitting the snap ring to be inserted around the corrugated plastic conduit. A right angular locking ear extends outwardly at a right angle from the snap ring and in a position opposite the opening for aiding in inserting the snap ring around the corrugated plastic conduit and for also aiding in removal of the snap ring from the corrugated plastic conduit, if desired.

The switch box inlet fitting for joining one end portion of a corrugated plastic conduit in an elongated inlet opening in one wall of a switch box includes a pair of semicircular clamping elements each including switch box inlet connector ends and corrugated plastic conduit clamping ends. The switch box inlet connector ends each have smooth exterior and interior surfaces adapted to slideably fit within the elongated inlet opening of the switch box and are adhesively secured therein. An integrally molded hinge member connects adjacent of the opposite sides of each of the clamping elements and permits the two clamping elements to be closed around opposite end portions of the corrugated plastic conduit. Integrally molded rib members extend inwardly from the inner concave surface of each of the clamping members and the rib members are adapted to fit within the depressions of the corrugated plastic conduit positioned therein. Locking means is provided for maintaining the clamping members in position completely surrounding the corrugated plastic conduits to maintain the same in position in the switch box. The hinge member and the locking means are both embedded in the opposite sides of the switch box inlet fitting so that they do not extend outwardly therefrom.

BRIEF DESCRIPTION OF THE DRAWINGS

Other objects and advantages will appear as the description proceeds when taken in connection with the accompanying drawings, in which—

FIG. 1 is a fragmentary elevational view of a wall of a building structure and illustrating the present system of corrugated plastic conduits installed therein;

FIG. 2 is an enlarged side elevational view of one of the connector fittings joining adjacent ends of a pair of corrugated plastic conduits in end-to-end relationship;

FIG. 3 is a slightly enlarged vertical sectional view taken substantially along the line 3—3 in FIG. 2;

FIG. 4 is an end elevational view showing the two semicircular clamping elements of the connector fitting of FIGS. 2 and 3 in opened relationship relative to each other;

FIG. 5 is an elevational view of the semicircular clamping elements looking at the right hand side of FIG. 4;

FIG. 6 is a fragmentary isometric view looking in the direction of the arrow 6 in FIG. 1 and showing the end portion of a corrugated plastic conduit being connected in an opening in one wall of a junction box by means of a junction box inlet connector in accordance with the present invention;

FIG. 7 is a vertical sectional view taken substantially along the line 7—7 in FIG. 6;

FIG. 8 is an isometric view of one of the semicircular flat snap ring elements of the junction box inlet connector;

FIG. 9 is a fragmentary isometric view looking in the direction of the arrow 9 in FIG. 1 and showing a switch box inlet fitting connecting one end portion of a corrugated plastic conduit in an elongate inlet opening in one wall of a switch box;

FIG. 10 is a vertical sectional view through the switch box inlet fitting of FIG. 9; and FIG. 11 is an isometric view of the switch box inlet fitting, with the two semicircular clamping elements in open position relative to each other.

DESCRIPTION OF THE PREFERRED EMBODIMENTS

The corrugated plastic conduits, broadly indicated at 10, are of a conventional and well-known type and are extruded with successive annular depressions and ribs, as best shown in FIG. 2, to provide flexibility so that the conduits 10 can be directed along and through building structural elements, such as spaced apart studs 11, to support and enclose electrical conductors or wires, such as indicated at 12, therein. In the system illustrated in FIG. 1, the plastic conduits 10 are joined together in end-to-end relationship by connector fittings, broadly indicated at 20. The corrugated plastic conduits 10 are also joined at one end portion to openings in the walls of a junction box 30 by means of junction box inlet connectors, broadly indicated at 31, and to a switch box 40 by a switch box inlet fitting, broadly indicated at 41.

As best shown in FIGS. 2-5, the connector fitting 20 includes a pair of semicircular molded plastic clamping elements 21, 22, each having opposite sides adapted to mate together and providing a circular passageway therebetween, as illustrated in FIG. 3. Each of the clamping elements 21, 22 also includes an inner concave surface defined by a radius $R_1$ positioned on a line extending between the opposite sides of each of the clamping elements (FIG. 4). An outer convex surface is provided on each of the clamping elements 21, 22 and is defined by a radius $R_2$ positioned outwardly of a line extending between opposite sides of each of the clamping elements. As clearly shown in FIG. 4, the radius $R_2$ is longer than the radius $R_1$ and the thickness of opposite side portions of each of the clamping elements 21, 22 is greater than the thickness of the medial portions of each of the clamping elements. As illustrated in FIG. 3, this provides a somewhat elongated oval appearance and configuration to the outside of the connector fitting 20, for purposes to be presently described.

An integrally molded hinge member 23 hingedly connects adjacent of the opposite sides of each of the clamping elements 21, 22 and permits the two clamping elements to be closed around opposite end portions of the corrugated plastic conduits 10, as illustrated in FIGS. 2 and 3. Integrally molded rib members 24, 25 extend inwardly from the central portions of the inner concave surfaces of each of the clamping members 21, 22 and act as separators when two opposite end portions of the corrugated plastic conduits 10 are placed in position in the clamping members 21, 22. Integrally molded rib members 26 are positioned on each side of the separator ribs 24, 25 and extend inwardly from the inner concave surfaces of each of the clamping members 21, 22 to fit within the depressions of the corrugated plastic conduits 10, when positioned therein, and hold the same in substantially end-to-end relationship when the two clamping elements or members 21, 22 are in clamping and mating relationship with each other. It is preferred that the innermost locking ribs 26 extend inwardly a slightly greater depth than the outermost locking ribs 26 and that the innermost locking ribs 26 extend completely around the inner concave surface of each of the clamping members while the outermost locking ribs 26 are thinner, shorter and are rounded at opposite ends. Also, it is preferred that the outer surfaces of opposite end portions of each of the clamping elements 21, 22 be tapered inwardly (FIG. 2) so that the connector fitting 20 will more easily pass through an opening provided in the studs 11 without catching or snagging.

Locking means is provided for maintaining the clamping members 21, 22 in position completely surrounding the corrugated plastic conduits 10. As shown in FIGS. 2-5, the locking means includes a rectangular locking slot 27 positioned in the side of the clamping member 22 opposite the hinge member 23, and a locking tongue 28 extending upwardly from the opposite side of the other clamping member 21. The upper end of the locking tongue 28 has an inclined cam surface and is adapted to extend into and through the locking slot 27 and to be maintained in engagement therewith when the clamping member 21 is positioned in clamping and mating relationship with the clamping member 22, as illustrated in FIG. 3. As the inwardly tapered upper portion of the locking tongue 28 is forced through the slot 27, it springs outwardly and then lockingly engages the lower edge of the tongue 28 and will not normally be easily removed therefrom.

If desired, the connector fitting 20 can be opened to release the ends of the corrugated plastic conduit 10 therefrom by springing the outer edge portion of the locking slot 27 outwardly and forcing the locking tongue 28 back through the locking slot. However, the locking tongue 28 will not be accidentally released since it is embedded and positioned within one thicker side portion of the connector fitting 20 and is protected by being inset in slots or grooves formed in the clamping elements 21, 22. Also, the hinge member 23 is embedded in the other thicker side portion of the connector fitting 20 so that it does not extend outwardly therefrom, as shown in FIG. 3.

To install the connector fitting 20, the plastic conduits 10 can be threaded through suitable openings in the studs 11 and opposite end portions brought into close proximity so that the clamping elements 21, 22 can be positioned around adjacent opposite end portions of the conduits 10. The locking ribs 26 engage the depressions adjacent each end of the conduits 10 as the clamping elements 21, 22 are closed around opposite end portions of the plastic conduits 10 and the locking tongue 28 is forced through the locking slot 27 to maintain the clamping elements 21, 22 in position completely surrounding the corrugated plastic conduits 10, as shown in FIGS. 2 and 3, and to thereby maintain the corrugated plastic conduits 10 in end-to-end relationship. If desired, opposite end portions of the plastic conduits 10 can be joined together before the plastic conduit 10 is threaded through the openings in the studs 11 and the connector fitting 20 will easily pass through the openings since it is rounded and tapered on opposite ends and does not greatly exceed the outer diameter of the plastic conduits 10.

The junction box inlet connector 31, illustrated in FIGS. 6–8, joins one end portion of the corrugated plastic conduit 10 to an opening in one wall of the junction box 30 and includes a pair of molded plastic snap ring elements each including a flat round portion having a thickness substantially equal to the width of the depressions in the corrugated plastic conduits 10. Each of the round portions of the snap ring elements includes an opening 33 (FIG. 8) of lesser width than the diameter of the depressions of the corrugated plastic conduit 10 for permitting the snap ring to be inserted around and removed from the corrugated plastic conduit 10. Each of the snap ring elements includes an integrally molded ear 34 extending outwardly at a right angle from the round flat portion and opposite the opening 33 for aiding in inserting the snap ring around the corrugated plastic conduit 10 and adjacent each side of the opening in the wall of the junction box 30, into which the corrugated plastic conduit 10 is inserted. With the snap ring elements 31 inserted in position in the depressions on opposite sides of the wall of the junction box 30, as shown in FIG. 7, the end portion of the corrugated plastic conduit 10 is securely connected to the junction box 30 so that it cannot be removed, unless the snap ring elements 31 are removed.

The switch box inlet fitting 41, shown in FIGS. 9–11, is provided for joining one end portion of the corrugated plastic conduit 10 to an elongate opening or insert sleeve 42 fixed in a molded opening boss in the wall of the switch box 40. The switch box inlet fitting 41 includes first and second semicircular clamping elements 43, 44 having opposite corrugated plastic conduit clamping ends and switch box inlet ends. The switch box inlet end includes concentric interior and exterior surfaces with the smooth exterior surfaces being adapted to fit within the sleeve 42 and be adhesively secured therein to maintain the switch box inlet fitting 41 in position on the switch box 40. The two semicircular clamping elements 43, 44 are joined together by an integrally molded hinge member 46 hingedly connecting adjacent of the opposite sides of each of the clamping elements 43, 44 and permitting the clamping elements to be closed around an end portion of the corrugated plastic conduit 10, as shown in FIG. 10.

Each of the clamping elements 43, 44 is provided with integrally molded rib members 47 extending inwardly from the inner concave surface of each of the clamping members and adapted to fit within depressions of the corrugated plastic conduits 10 positioned therein. Locking means is provided for maintaining the clamping members 43, 44 in position completely surrounding the end portion of a corrugated plastic conduit 10 and includes a locking slot 48 positioned in one opposite side of the clamping member 44 opposite the hinge member 46, and a locking tongue 49 extending outwardly from the opposite side of the other of the clamping members 43 and adapted to extend into and engage with the locking slot 48 when positioned in clamping and mating relationship with the other clamping member and surrounding the plastic conduit 10.

The corrugated plastic conduit clamping end of the switch box inlet fitting 41 is substantially identical to the connector fitting 20 with the inner concave surface of both clamping elements 43, 44 being defined by a radius positioned on a line extending between the opposite sides while the outer convex surface is defined by a longer radius positioned outwardly of the line extending between opposite sides. The thickness of opposite side portions of the plastic conduit clamping end of the inlet fitting 41 is greater than the thickness of the medial portions so that the hinge 46, the locking tongue 49 and locking slot 48 are embedded and inset in protective grooves in the clamping members 43, 44. The switch box inlet fitting 41 thus provides a convenient means for connecting an end portion of the corrugated plastic conduit 10 to an inlet opening in one wall of the switch box 40.

The system of the present invention includes the connector fittings 20 for joining adjacent ends of a pair of corrugated plastic conduits 10 in end-to-end relationship, junction box inlet connector means 31 for joining one end portion of the corrugated plastic conduit 10 in an opening in one wall of a junction box 30, and a switch box inlet fitting 41 for joining one end portion of the corrugated plastic conduit 10 in an elongated inlet opening or sleeve 42 in one wall of a switch box 40.

In the drawings and specification there has been set forth the best mode presently contemplated for the practice of the present invention, and although specific terms are employed, they are used in a generic and descriptive sense only and not for purposes of limitation, the scope of the invention being defined in the claims.

That which is claimed is:

1. A system for supporting and enclosing electrical conductors in corrugated plastic conduits extending through building structural elements and including junction boxes, and switch boxes supported in selected locations on said building structural elements, said system including A. a connector fitting joining adjacent ends of a pair of said corrugated plastic conduits in end-to-end relationship, said connector fitting comprising
(1) a pair of semicircular clamping elements, each including opposite sides adapted to mate together and providing a circular passageway therebetween,
(2) an integrally molded hinge member hingedly connecting adjacent of said opposite sides of each of said clamping elements and permitting said pair of clamping elements to be closed around the adjacent end portions of said pair of corrugated plastic conduits, (3) integrally molded rib members extending inwardly from said inner concave surface of each of said clamping elements and fitting within depressions of the corrugated plastic conduits positioned therein, and (4) locking means for maintaining said pair of clamping elements in position completely surrounding said corrugated plastic conduits, said locking means including a locking slot positioned in one of said opposite sides of said clamping elements opposite said hinge member, and a locking tongue extending upwardly from the opposite side of the other of said clamping elements and extending into and engaging with said locking slot, said locking means and said hinge member being embedded in said opposite sides of said clamping elements so that they do not extend outwardly from opposite sides of said connector fitting, B. junction box inlet connector means for joining one end portion of said corrugated plastic conduits in an opening in a wall of a junction box and comprising (1) a pair of snap ring elements each including a round flat portion having a thickness substantially equal to the depressions of said corrugated plastic conduits, each of said snap ring elements including an opening of lesser width than the diameter of the depressions of said corrugated plastic conduit for permitting said snap ring to be inserted around said corrugated plastic conduit, and (2) an ear extending outwardly at a right angle from said round flat portion and opposite the opening for aiding in inserting a snap ring around said corrugated plastic conduit and adjacent each side of an opening in the wall of the junction box through which said corrugated plastic conduit is to be inserted, and C. a switch box inlet fitting for joining one end portion of said corrugated plastic conduits in an elongated inlet opening in a wall of switch box and comprising (1) a pair of semicircular clamping elements each including opposite switch box inlet ends and corrugated plastic conduit clamping ends with the switch box inlet ends each having concentric interior and exterior surfaces with the exterior surface being smooth and adapted to fit within the inlet of the switch box, (2) an integrally molded hinge member hingedly connecting adjacent of the opposite sides of each of said clamping elements and permitting said two clamping elements to be closed around and end portion of said corrugated plastic conduit, (3) integrally molded rib members extending inwardly from the inner concave surface of each of said clamping elements and adapted to fit within depressions of corrugated plastic conduits positioned therein, and (4) locking means for maintaining said clamping elements in position completely surrounding said corrugated plastic conduits, said locking means and said hinge members being embedded in said opposite sides of said clamping elements so that they do not extend outwardly from opposite sides of said switch box fitting when closed around an end portion of said corrugated plastic conduit.

2. A system according to claim 1 wherein each of said semicircular clamping elements includes an inner extending between said opposite sides of each of said clamping elements, and a convex outer surface defined by a radius positioned outwardly of a line extending between said opposite sides of each of said clamping elements so that the thickness of opposite side portions of each of said clamping elements is greater than the thickness of the medial portions of each of said clamping elements.

3. A system according to claim 1 wherein said locking means of switch box inlet fitting includes a locking slot positioned in one of said opposite sides of one of said clamping elements opposite said hinge member, and a locking tongue extending upwardly from the opposite side of the other of said clamping elements and adapted to extend into and engage with said locking slot when positioned in clamping and mating relationship with the other clamping element.

4. A system according to claim 1 wherein said hinge member on one side of said clamping elements of said connector fitting and said locking means on the other side of said clamping elements are both inset in said clamping elements.

5. A system according to claim 1 wherein said corrugated plastic conduit clamping ends of said clamping elements of said switch box inlet fitting are thicker along opposite side portions than along their medial portions.

6. A connector fitting for joining adjacent ends of a pair of corrugated plastic conduits in end-to-end relationship, said connector fitting comprising (1) a pair of semicircular clamping elements, each including opposite sides adapted to mate together and to provide a circular passageway therebetween, (2) an integrally molded hinge member hingedly connecting adjacent of said opposite sides of each of said clamping elements and permitting said pair of clamping elements to be closed around opposite end portions of said corrugated plastic conduits, (3) integrally molded rib members extending inwardly from said inner concave surface of each of said clamping elements and adapted to fit within depressions of said corrugated plastic conduits to be positioned therein, and (4) locking means for maintaining said clamping elements in position completely surrounding said corrugated plastic conduits, said locking means including a locking slot positioned in one of said opposite sides of one of said clamping elements opposite said hinge member, and a locking tongue extending outwardly form the opposite side of the other of said clamping elements and adapted to extend into and engage with said locking slot when positioned in clamping and mating relationship with the other clamping element, said clocking means and said hinge member being embedded in said opposite sides of said clamping elements so that they do not extend outwardly from opposite sides of said connector fitting when surrounding said corrugated plastic conduits.

7. A connector fitting according to claim 6 wherein each of said semicircular clamping elements includes an inner concave surface defined by a radius positioned on a line extending between said opposite sides of each of said clamping elements, and a convex outer surface defined by a radius positioned outwardly of a line extending between said opposite sides of each of said clamping elements so that the thickness of opposite side portions of each of said clamping elements is greater than the thickness of the medial portions of each of said clamping elements.

8. A connector fitting according to claim 7 wherein said hinge member on one side of said clamping elements and said locking means on the other side of said clamping elements are both embedded in said thicker opposite side portions of said clamping members.

9. A switch box inlet fitting for joining one end portion of a corrugated plastic conduit in an elongated inlet opening in one wall of a switch box and comprising (1) a pair of semicircular clamping elements each including opposite switch box inlet ends and corrugated plastic conduit clamping ends with the switch box inlet ends each having concentric interior and exterior surfaces with the exterior surface being smooth and adapted to fit within the inlet of the switch box, (2) an integrally molded hinged member hingedly connecting adjacent of the opposite sides of each of said clamping elements and permitting said two clamping elements to be closed around an end portion of said corrugated plastic conduit, (3) integrally molded rib members extending inwardly from the inner concave surface of each of said clamping elements and adapted to fit within depressions of corrugated plastic conduits positioned therein, and (4) locking means for maintaining said clamping elements in position completely surrounding said corrugated plastic conduits, said locking means and said hinge member being embedded in said opposite sides of said clamping elements so that they do not extend outwardly from opposite sides of said switch box fitting when closed around an end portion of said corrugated plastic conduit.

* * * * *

UNITED STATES PATENT AND TRADEMARK OFFICE
CERTIFICATE OF CORRECTION

PATENT NO.   :   4,829,145

DATED        :   May 9, 1989

INVENTOR(S)  :   Robert A. Mitchell and Thomas E. Lavely

It is certified that error appears in the above-identified patent and that said Letters Patent is hereby corrected as shown below:

Column 7, line 13, following "of" (second occurrence) insert -- one of --; line 45, following "of" insert -- a --; line 57, change "and" to -- an --; line 67, change "members" to -- member --.

Column 8, line 6, following "inner" insert -- concave surface defined by a radius positioned on a line --; line 16, following "of" insert -- said --; line 57, change "form" to -- from --; line 61, change "clocking" to -- locking --.

Column 10, line 3, change "hinged" to -- hinge --.

Signed and Sealed this

Tenth Day of October, 1989

Attest:

DONALD J. QUIGG

Attesting Officer

Commissioner of Patents and Trademarks